(No Model.) 4 Sheets—Sheet 1.
J. H. THOMAS & J. E. OFFUTT.
COMBINED HAY RAKE AND TEDDER.
No. 337,891. Patented Mar. 16, 1886.
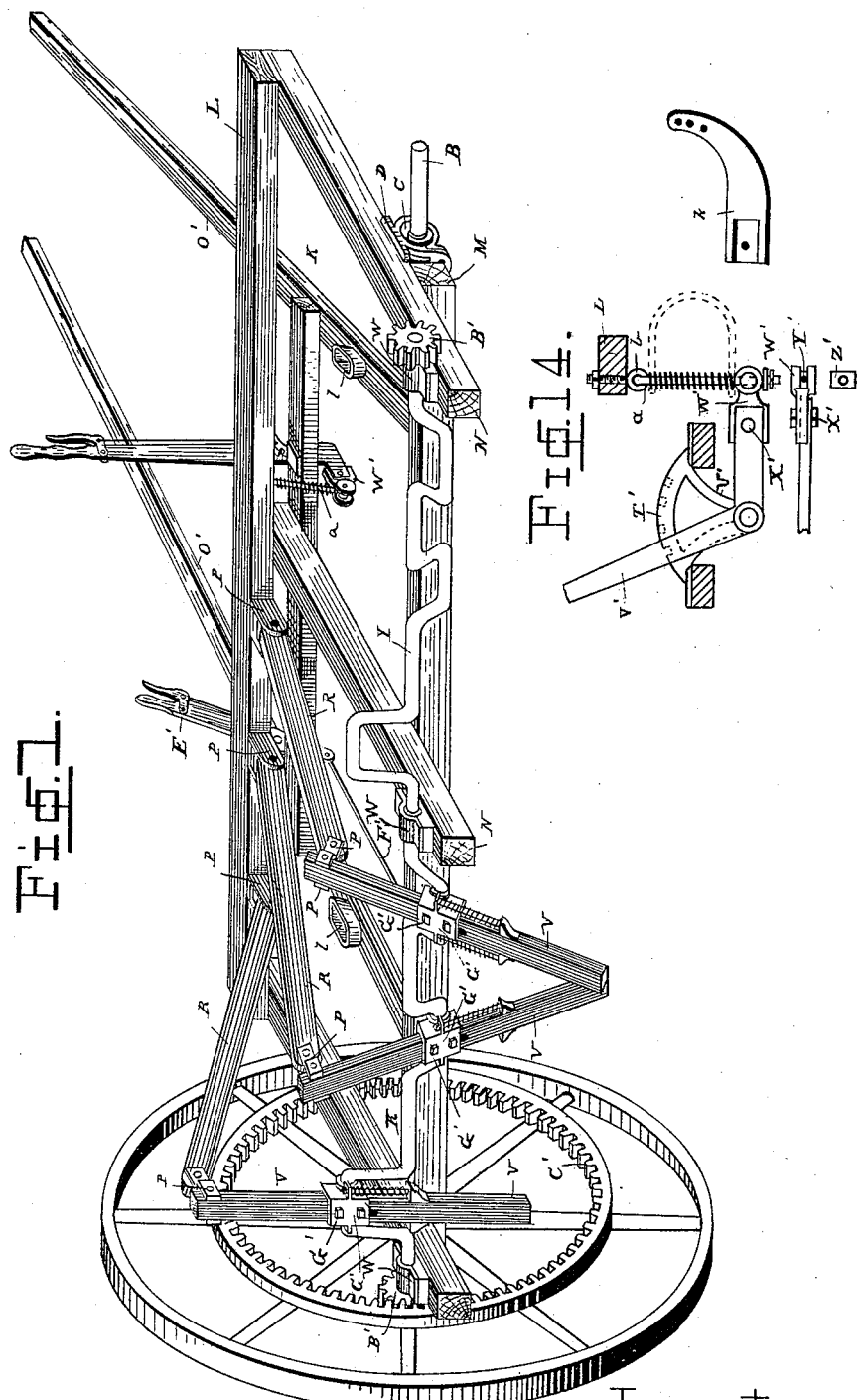
Attest.
Edwin L. Bradford
LcLean O'Brien
Inventor.
John H. Thomas
Joseph E. Offutt
By Toulmin & Jemmes
attys.

(No Model.) 4 Sheets—Sheet 2.
J. H. THOMAS & J. E. OFFUTT.
COMBINED HAY RAKE AND TEDDER.
No. 337,891. Patented Mar. 16, 1886.
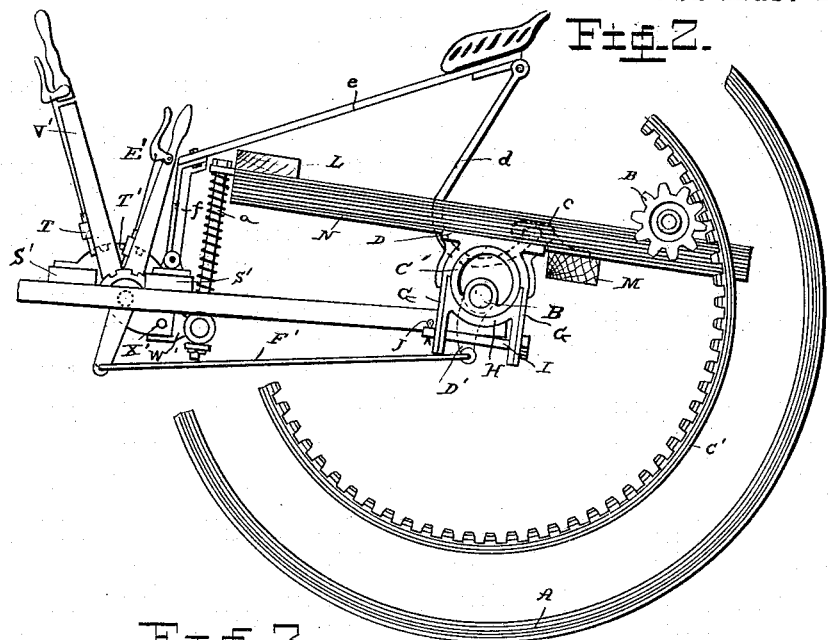
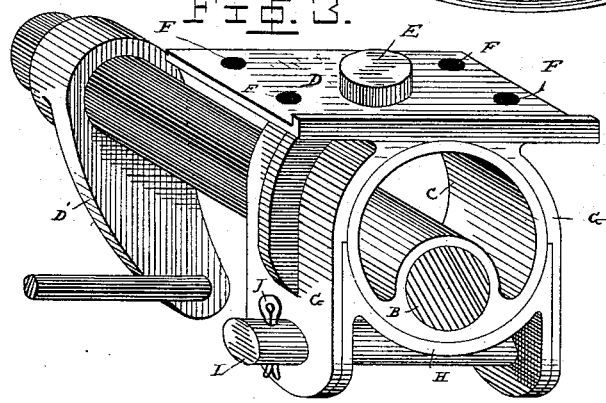
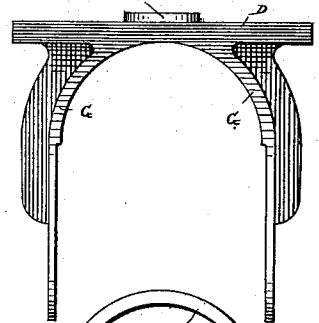
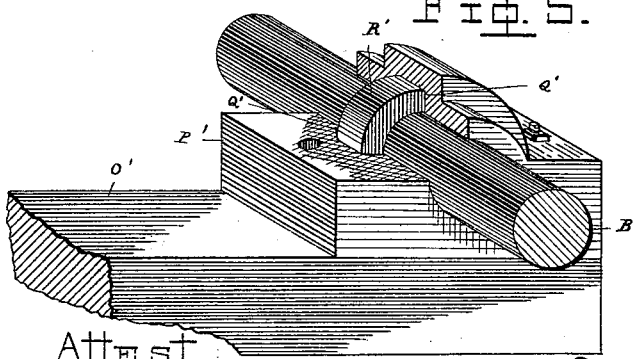
Attest
Edwin L. Bradford
Lucian O'Brien
Inventor.
John H. Thomas and
Joseph E. Offutt.
By Toulmin & Gemmes
attys.
N. PETERS. Photo-Lithographer, Washington, D. C.

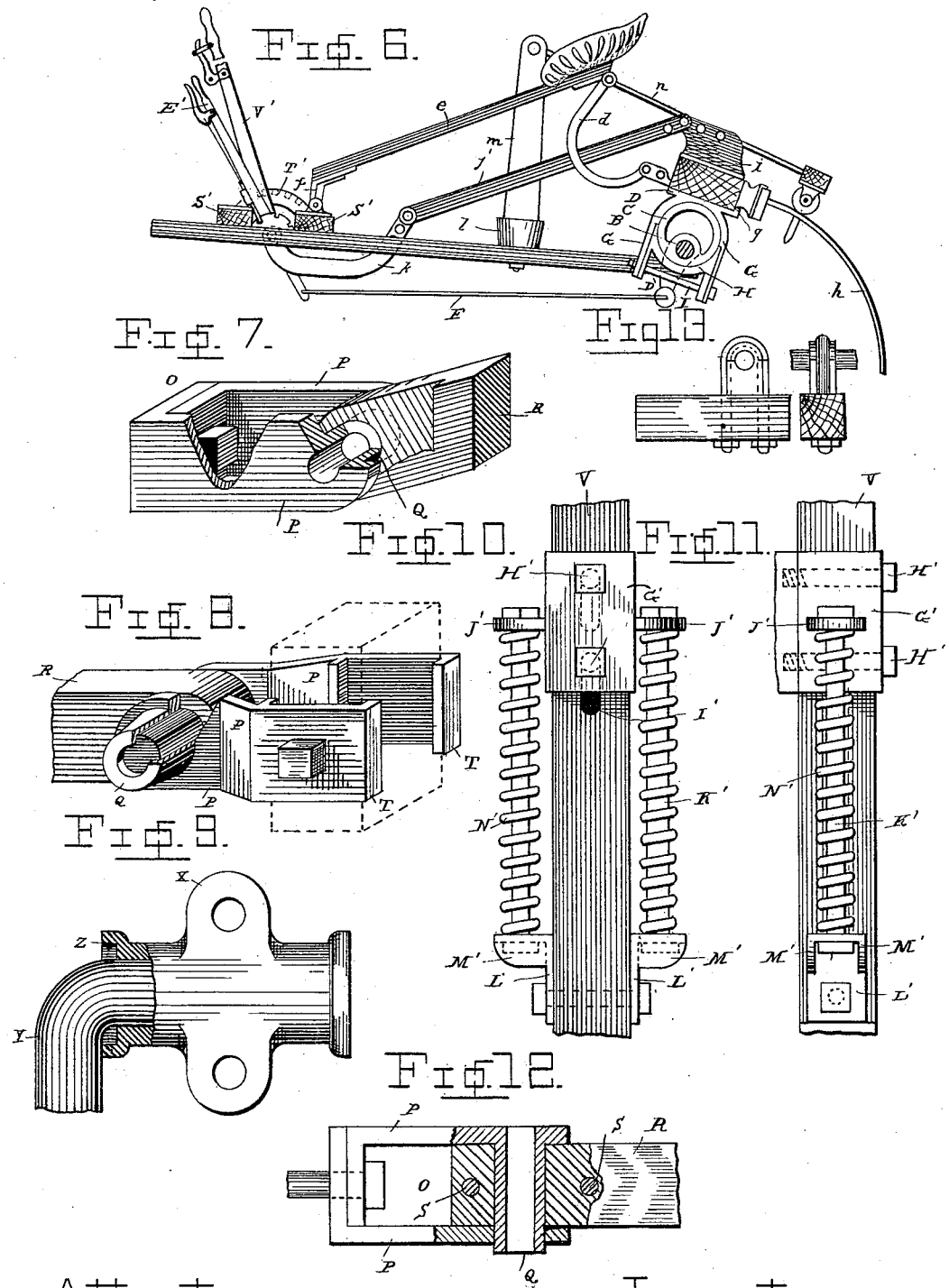

(No Model.) 4 Sheets—Sheet 4.
J. H. THOMAS & J. E. OFFUTT.
COMBINED HAY RAKE AND TEDDER.
No. 337,891. Patented Mar. 16, 1886.
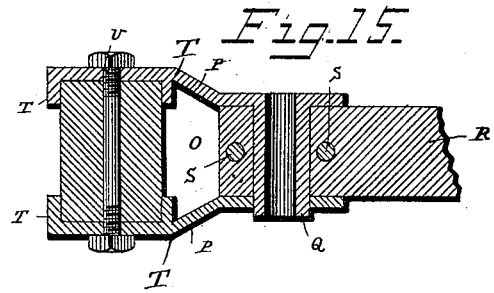
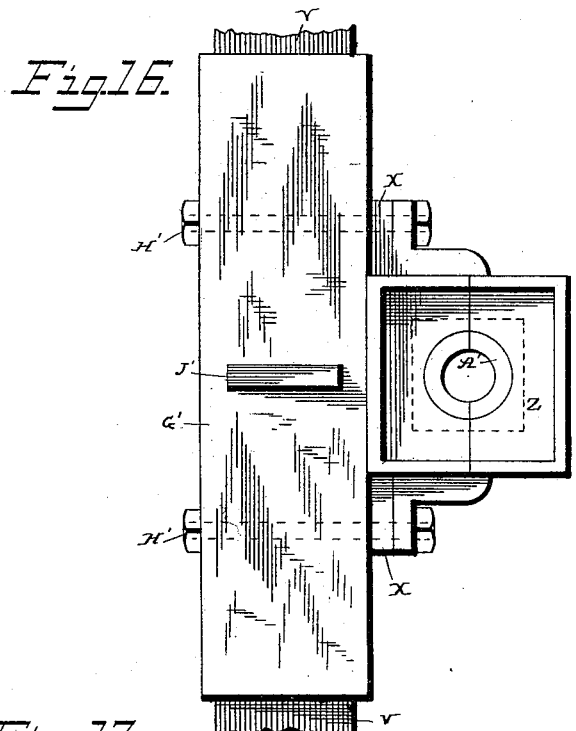
WITNESSES
INVENTOR

UNITED STATES PATENT OFFICE.

JOHN H. THOMAS AND JOSEPH E. OFFUTT, OF SPRINGFIELD, OHIO; SAID OFFUTT ASSIGNOR TO SAID THOMAS.

COMBINED HAY RAKE AND TEDDER.

SPECIFICATION forming part of Letters Patent No. 337,891, dated March 16, 1886.

Application filed August 6, 1885. Serial No. 173,723. (No model.)

*To all whom it may concern:*

Be it known that we, JOHN H. THOMAS and JOSEPH E. OFFUTT, citizens of the United States, residing at Springfield, in the county of Clark and State of Ohio, have invented certain new and useful Improvements in Combined Hay Rakes and Tedders, of which the following is a specification, reference being had therein to the accompanying drawings.

This invention relates to certain new and useful improvements in combined hay rakes and tedders; and it has for its objects, first, to provide means for yieldingly sustaining the forward part of the tedder-frame in such manner that the yielding capacity shall be uniform, whatever the relative position of the tedder-frame to the ground, and not subject to yielding a short distance under slight pressure when the frame is adjusted away from the thills, and then to become less yielding and to require greater pressure to yield at all when the frame is adjusted nearer to the thills, as is the case with the devices heretofore employed for this purpose, the design in view being to cause the frame to uniformly yield or give to obstructions with which the tedder-teeth come in contact; second, to provide means for connecting the tedder and rake frames with the supporting-axle in such manner that the said frames may be interchangeably used in conjunction with the same running-gear, the said means being also so constructed as to shift the tedder backward and forward and engage and disengage the tedder-shaft pinions from the operating-gears; third, to provide a tedder-shaft journal-box of such character that the crank in the shaft will be prevented from working into the bearing and binding itself against free rotation, and also of such character as to reduce the metallic wear between the box and the tedder-shaft; fourth, to provide a box for connecting the supporting-axle and the thills together, and yet preventing the latter from lateral displacement on the former; and, fifth, to provide for holding the rear of the tedder-frame down against the tendency of the operating-gears, to elevate it by connecting the seat with the frame at a point in the rear of the axle, and arranging the other support of the seat so as to accommodate itself to the movements of the frame.

In the accompanying drawings, forming a part of this specification, and on which similar letters of reference indicate the same or corresponding features, Figure 1 represents a perspective view of our improved machine, showing the same with the tedder-frame mounted upon the running-gear, but having the seat and several of the tedder and radius arms and one wheel removed; Fig. 2, a side elevation with the supporting-wheel and operating-gear partially broken away; Fig. 3, a detached perspective view of a portion of the supporting-axle, the mounting-eccentric, and the connecting-plate, &c.; Fig. 4, an end elevation of the connecting-plate and its locking-section, also showing the eccentric inside view; Fig. 5, a detached perspective view of the thill-box, showing a portion of the supporting-axle mounted therein; Fig. 6, a side elevation of the rake-frame; Fig. 7, an enlarged perspective view of the tedder-frame and radial arm-coupling, showing one form thereof; Fig. 8, a like view showing another form of coupling; Fig. 9, a partial bottom and sectional view of the tedder-shaft journal-box, showing a short piece of said shaft fitted therein; Figs. 10 and 11, rear and side views, respectively, of the tedder-arms and the attached devices; Fig. 12, a partial plan and partial sectional view of another form of coupling; Fig. 13, side and edge views of the intermediate supports for the tedder-shaft; Fig. 14, a detached side elevation of the means for yieldingly sustaining the forward part of the tedder-frame, showing the adjacent parts of the machine in cross-section; Fig. 15, a like view to Fig. 12, showing the coupling constructed to couple the radius-arms to the tedder-arms; Fig. 16, a plan view of one part of the tedder-shaft journal-box; and Fig. 17, an end view of the same, showing its application to the tedder-arm sleeve.

The letter A designates the carrying-wheels, of the ordinary or any approved construction, in which is loosely mounted the metallic supporting-axle B, and to this axle, and approximately near each end thereof, are firmly secured the mounting-eccentrics C, which are preferably of the form shown in the drawings, being skeleton, so as to reduce their weight, and are constructed preferably of malleable cast-iron.

The letter D indicates a malleable-iron connecting-plate having a stud, E, and apertures F, for effecting a firm union thereof with the frames to be presently described, and also having integral depending cheek-pieces G, configurated so as to form a partial journal-box for the eccentrics, and notched, as clearly seen in Figs. 3 and 4, to receive the upper ends of the locking-section H, fashioned to fit within said cheek-pieces and to form the lower portion of the journal-box.

The cheek-pieces G and the locking-section H have coincident openings, through which passes the locking-bolt or pin I, having a nut or split key, J, to maintain it in position, whereby the journal-box is kept in its integrity and the connecting-plate united with the axle.

The letter K indicates the tedder-frame, consisting of the forward and rear beams, L and M, united by the several longitudinal pieces, N, the outer ones of which are secured to the connecting-plates D by being recessed to receive the studs E, and bored to receive the bolts which pass through the apertures F.

The letter O designates the coupling employed for connecting the radius-arms with the tedder-frame and with the tedder-arms, and consists of the plates P, preferably constructed of cast-iron and adapted to overlap each other at one end, where they are both provided with an aperture for the reception of a connecting-bolt. One of the plates has cast integrally therewith a tubular extension or sleeve, Q, while the other plate is provided with an opening which receives the sleeve, the office of which is to form a fulcrum-point for the radius-arm R, the arm being bored to receive the same, and having a saw-kerf which allows the lost motion caused by wear to be taken up by means of the bolts S.

It will be observed that the strain exerted upon the radius-arms in controlling the movements of the tedder-arms is in a longitudinal direction with the radius-arms, thereby causing the impingement between the radius-arms and the sleeves Q to be against the grain of the wood of said arms, the result of which is to cause the arms to last much longer.

The form of coupling shown in Fig. 12 is designed to connect the radius-arms with the forward beam of the tedder-frame, and the form shown in Fig. 15 is designed to connect the radius-arms with the tedder-arms, the difference being in omitting the overlapping ends and in forming on the plates P the ribs T, which embrace the tedder-arms and form a rigid connection therewith, a bolt, U, being also employed, as clearly seen in Fig. 15.

In Figs. 7 and 8 we have shown two other forms of the coupling O, the change made in the coupling shown in Fig. 7 being in casting both plates P with sleeves Q, the sleeves meeting in the center. The change made in the coupling shown in Fig. 8 consists in casting the sleeve Q on the outer sides of the plates P, and in fitting a wooden pin therein and through an eye in the end of the radius-arm R. Either of these forms of couplings may be used.

Near the rear ends of the end pieces, N, of the tedder-frame are mounted the tedder-shaft journal-boxes W, of the ordinary character; or they may be of the character shown in Fig. 9, consisting of the two-part cast sleeves having lugs X, provided with apertures for the reception of bolts, whereby they are secured. At either end, and where the crank of the tedder-shaft Y occurs, we provide the box with annular recesses Z, of sufficient depth and width to clear the curve occurring at the juncture of the crank and the shaft, whereby the shaft is prevented from binding in the box, and the box and shaft prevented from wearing each other away, as is the case when a sharp corner of the box presents itself against the said curved portion.

As constructed, the ends of the box beyond the recesses Z serve to prevent the shaft from moving longitudinally, should the journal portion of the shaft be about the length of the box, as seen in Fig. 9.

In Fig. 16 we have shown a modification of the journal-box, in which the box is enlarged from the outer ends for some distance toward the middle, and in the enlarged portions are fitted wooden bushings A', having apertures of the same size as the bore of the box, whereby they form a continuation of the bearing for the tedder-shaft. The object of this construction is to reduce the wearing or grinding action between the shaft and box, for it is found that ordinary iron against ordinary iron will wear quicker than wood against iron of this character.

In order to keep the bushings in place, the boxes are cast with annular beads W''', and the adjacent ends of the bushings are formed to fit the same, and, being in two parts, are easily inserted.

The tedder-shaft Y at either end is provided with a pinion, B', each of which intergears with a cog-rim, C', secured to the respective supporting-wheels A, whereby rotary motion is imparted to the tedder-shaft. The engagement and disengagement of these pinions and cog-rims are effected by means of the eccentrics C, already described in connection with the arm D', secured rigidly to the supporting-axle B, and operating hand-lever E', mounted on a stud secured to one of the thills, and connected with said arm by a pitman, F', whereby the eccentrics are partially rotated and the tedder-frame thrown backward or forward, as may be desired, thus making or breaking the engagement of said pinions and cog-rims.

The tedder-arms V are connected to the cranks of the tedder-shaft by metal sleeves G', which envelop the arms and are provided with holes and bolts H', which latter pass through slots I', formed in the arms V, whereby the latter are free to move back and forth in the sleeves a sufficient distance to assist in overcoming any obstruction with which they may meet in operation. To the forward sides of the said sleeves are attached, also, by means of the said bolts H', the journal-boxes, the peculiar construction of which, as already described, serves the same purpose, in this instance, as when the boxes are attached to the pieces N of the tedder-frame. The sleeves G' are also provided with lugs J', through which pass bolts K', and the arms V are provided with metallic brackets L', through which the said bolts also pass, the cheek-pieces M' of which prevent the nuts from unscrewing, and also hold them when the bolts are being screwed into them.

Around each of the bolts K', and between the brackets L' and the lugs J', are fitted spiral springs N', whose office is to hold the tedder-arms down to their work, to allow them to yield upwardly, and to return them to normal position when an obstruction is overcome.

The thills O' are secured to the supporting-axle B by means of the two-part boxes P', bolted to the thills, and constructed in each part with an annular recess, Q', in which an annulus or collar, R', rigidly secured to the supporting-axle B', is fitted. By this means it will be observed that the thills are strongly secured to the axle and are maintained against lateral displacement. The thills are connected just forward of the tedder-frame by cross-pieces S', and to these pieces is secured a toothed segment, T', having a downwardly-extending portion, U', which forms a fulcrum-point for the adjusting-lever V', having a detent for locking into the segment. This lever has a rearwardly-extending portion, to which is fitted one end of a guide, W', the guide being recessed at one side to receive the lever, and a bolt, X', being employed to secure them together. The rear end of the guide is slotted, as seen at Y', Fig. 14, and is also bored to receive a short shaft, Z', having an aperture through which passes the rod $a$, which also works freely in the slot Y'. This rod is connected at one end in any convenient manner with the forward part of the tedder-frame, and at the lower end is provided with a washer and a split key or other means to maintain its position with respect to the guide W' and shaft Z'. A collar or other enlargement, $b$, is formed on the rod near its upper end, and a spiral or U-shaped or other convenient form of spring is interposed between the collar $b$ and the guide W', whereby the weight of the forward portion of the tedder-frame is sustained and the rear end thereof allowed to vary its altitude, the spring yielding to the up-and-down movement of the forward part of the said frame.

The general position of the frame with respect to the ground is adjusted by means of the adjusting-lever V' and the rod $a$, and by once adjusting this general position the supporting-point of the spring is relatively adjusted, so that the ability of the frame to yield to any obstruction with which the tedder-arms come in contact is made uniform, whatever be the relative position of the frame to the ground. This would not be the case if in adjusting the frame to different positions the supporting-point of the spring were not also correspondingly adjusted, for if the supporting-point of the spring remains the same without regard to the change in the position of the frame, then when the forward part of the frame is adjusted comparatively high the spring would be easy to compress; but when the forward part is adjusted comparatively low, the spring, being thereby partially compressed, would be harder to further compress.

The necessity of changing the position of the frame with respect to the ground grows out of the difference in weight of the grass or hay in different parts of the field, for where it is lighter the tedder-forks should be lowered, and where it is heavier they should be raised slightly, as the weight of the grass or hay tends to draw the forks downwardly. The necessity of changing the position also grows out of the fact that the angle between the tedder-frame and the ground is varied when going up hill from that when going down hill, and hence the frame must be adjusted to maintain a proper angle under all conditions. It is this variance in the position of the frame that causes the spring to present more or less yielding capacity when the tedder-arms meet an obstruction, and to overcome this defect is the object in adjusting the supporting-point of the spring correspondingly to the adjustment of the frame, so that the spring will at all times be normally set, no matter what the position of the frame may be.

To the rear cross-piece of the tedder-frame is secured a bracket, $c$, to the forward end of which is pivotally connected a curved seat-standard, $d$, in such manner that the weight of the seat and driver will fall upon the tedder-frame in the rear of the axle, whereby the tendency of the operating cog-rims upon the pinions to elevate the rear end of the tedder-frame is counterbalanced. The upper end of the standard $d$ is pivotally connected with the seat-beam $e$, and this beam in turn is bolted firmly to the pivoted standard $f$, having its pivotal point connected to one of the cross-pieces S' of the thills. The seat is secured to this beam over or approximately over the standard $d$, and the flexibility of the several connections admits of the easy adjustment to and fro and up and down of the tedder-frame without materially disturbing the position of the seat.

The several devices so far described have special reference to the machine when used as a tedder. In Fig. 6, however, we have represented a rake applied in substitution of the tedding mechanism, the rake-head $g$ being supplied with the connecting-plates D, having the cheek-pieces G, as already described. The rake-head also carries the usual tines, $h$, and a metallic bracket, $i$, (having a series of apertures,) with which connects the pitman $j$ at one end, the other end being pivotally connected with the extension $k$ of the adjusting-lever V', which extension also has a series of apertures, whereby the relative position of the lever and rake-head may be adjusted to suit circumstances.

The seat-standard is connected to the rake-head when the machine is used as a rake, in lieu of being connected to the tedder-frame; but in this instance the connection is forward of the center of the axle, so as to assist in lifting the tines. To the thills are secured the metal pockets *l*, having conically-shaped interiors, so as to receive the correspondingly-shaped ends of the standards *m*, to the upper ends of which are pivotally connected the tine-clearers *n*. The position of the rake-head is adjusted by the lever E' in the same manner as the position of the tedder-frame is adjusted.

In using the machine in these two capacities the same locking-sections H and pins I are used, and the removal of the tedder-frame and substitution of the rake is effected in the following manner: Disconnect the seat-standard from the tedder-frame and the guide W' from the rearward extension of the lever V', and then withdraw the locking-pin I from the cheek-pieces and the locking-section, when the frame, together with the attached devices, can be lifted from the running-gear. This done, lift the rake and place the cheek-pieces over the eccentric, and then insert and secure the locking-pins. Then attach the seat-standard to the rake-head and the extension *k* to the adjusting-lever V', when the machine will be ready for raking purposes.

In Fig. 13 is represented a two-part journal-box and a metallic strap which holds the two together, the function of which is to sustain an intermediate point of the tedder, should the same vibrate under unusual circumstances, and is only intended to be used should occasion require.

The coupling for connecting the radial arms and the tedder-arms together and the radial arms with the main frame forms the subject-matter of another application filed by us on the 9th day of November, 1885, Serial No. 182,190, for improvements in coupling-irons for tedders.

We would observe that it has come to our knowledge that it is not now new to interpose a spring between the thills and the frame of a hay-spreader, whereby the frame is yieldingly sustained at the forward end; but in the instance here alluded to the support of the spring is not adjusted correspondingly to the movement of the frame by the act of adjusting the frame.

Having thus fully described our invention, what we claim as new, and desire to secure by Letters Patent, is—

1. In a hay-tedder, the combination, with the thill-frame and the tedder-frame, of the adjusting-lever and the yielding support supported by the lever and interposed between it and the tedder-frame and constructed to support said frame, the yielding capacity of the support being the same, whatever the position of the lever may be.

2. In a hay-tedder, the combination, with the thill-frame and the tedder-frame, of the pivoted lever, the rod connected with the lever and with the tedder-frame, and a spring for supporting said frame, interposed between it and the lever and supported by the lever, the yielding capacity of the support being the same, whatever the position of the lever may be.

3. In a hay-tedder, the combination, with the thill-frame, the pivoted lever and its detent, the locking-segment, the guide secured to the lever, and the rod adapted to play through the lever, of the tedder-frame to which the rod is connected, and a spring for supporting said frame, interposed between it and the lever and guided by said rod, the yielding capacity of the support being the same, whatever the position of the lever may be.

4. In a hay-tedder, the combination, with the thills and cross-piece, the segment, the lever, and the guides secured to the lever, of the tedder-frame, the rods secured thereto, and the spring interposed between the frame and the guide, the lever and spring being adapted to adjust the frame to different positions, the yielding capacity of the support being the same, whatever the position of the lever may be.

5. In a rake and tedder, the combination, with the axle and eccentrics mounted thereon, of connecting-plates having cheek-pieces, and the locking-section and means to secure the section to the cheek-pieces.

6. In a hay rake and tedder, the combination, with the axle and the eccentrics secured thereon, of the tedder-frame, the connecting-plates secured thereto and having cheek-pieces, and the locking-sections adapted to fit within the cheek-pieces and to embrace the eccentrics, and means to lock the sections to said pieces.

7. In a hay rake and tedder, the combination, with the axle having the eccentrics secured thereon, of the tedder-frame, the connecting-plates secured thereto and having cheek-pieces, the locking-sections, means to secure them to said pieces, the arm secured to the axle, the lever, and the connecting-pitman, whereby the eccentrics are actuated and the frame adjusted to and fro.

8. In a hay rake and tedder, the combination, with the axle having eccentrics and an arm secured thereon, the lever, and the pitman connecting it with said arm, of the tedder-frame, the connecting-plates secured thereto and having cheek-pieces, the locking-sections locked to said pieces, the tedder-shaft mounted upon said frame, and the cog-rims mounted on the drive-wheels intergearing with the tedder-shaft pinions.

9. In a hay rake and tedder, the combination, with the axle, the eccentrics and arm secured thereon, and a lever and pitman for actuating the same, of the rake-head, the connecting-plates secured thereto and having cheek-pieces, and the locking-sections locked to said pieces.

10. The combination, with the tedder-frame mounted upon the axle, the tedder-shaft and pinions, and the cog-rims mounted on the drive-wheels, of the seat-standard secured to the frame between the tedder-shaft and the axis of the axle, and the seat-beam pivotally connected with the thills and to the seat, whereby the weight of the driver holds the pinions down against the lifting action of the cog-rims.

11. The combination, with the rake-head mounted upon the axle, of the seat-standard pivotally connected to the head in front and above the axis of the axle, and the seat-beam pivotally connected with the thills and connected to the seat.

12. The combination, with the tedder-arm, of the coupling consisting of two plates rigidly secured thereto, one of which has a sleeve extending therefrom and into the other, and the radius-arm pivotally mounted on said sleeve.

13. The combination, with the tedder-arm, of the lugs fitted thereto and the sleeve fitted over the arm, the rods connecting the sleeve and lugs, and the interposed springs.

14. The combination, with the tedder-arm, of the springs, and the tedder-shaft boxes secured thereto and having the recessed ends, and the tedder-shaft passing through the boxes and having its cranks in proximity to said recesses.

15. The combination, with the tedder-frame and the tedder-arms, of the boxes secured to the frame and the boxes secured to the arms, both being provided with recessed ends, and the tedder-shaft journaled in said boxes.

16. A tedder-shaft box constructed with recessed ends, whereby the tedder-shaft is prevented from having longitudinal motion and from binding in the box at the juncture of the shaft and the crank.

17. A tedder-shaft box constructed with enlarged portions having wooden bushings fitted therein and having its ends recessed.

18. The combination, with the axle having the annuli, of the two-part boxes having recesses in which said annuli fit, and the thills secured to said boxes.

In testimony whereof we affix our signatures in presence of two witnesses.

JOHN H. THOMAS.
JOSEPH E. OFFUTT.

Witnesses:
JOHN L. ZIMMERMAN,
B. WINWOOD DIEHL.